Aug. 18, 1942.   C. C. DE PEW   2,293,050
SPEED CHANGE MECHANISM
Filed May 27, 1940
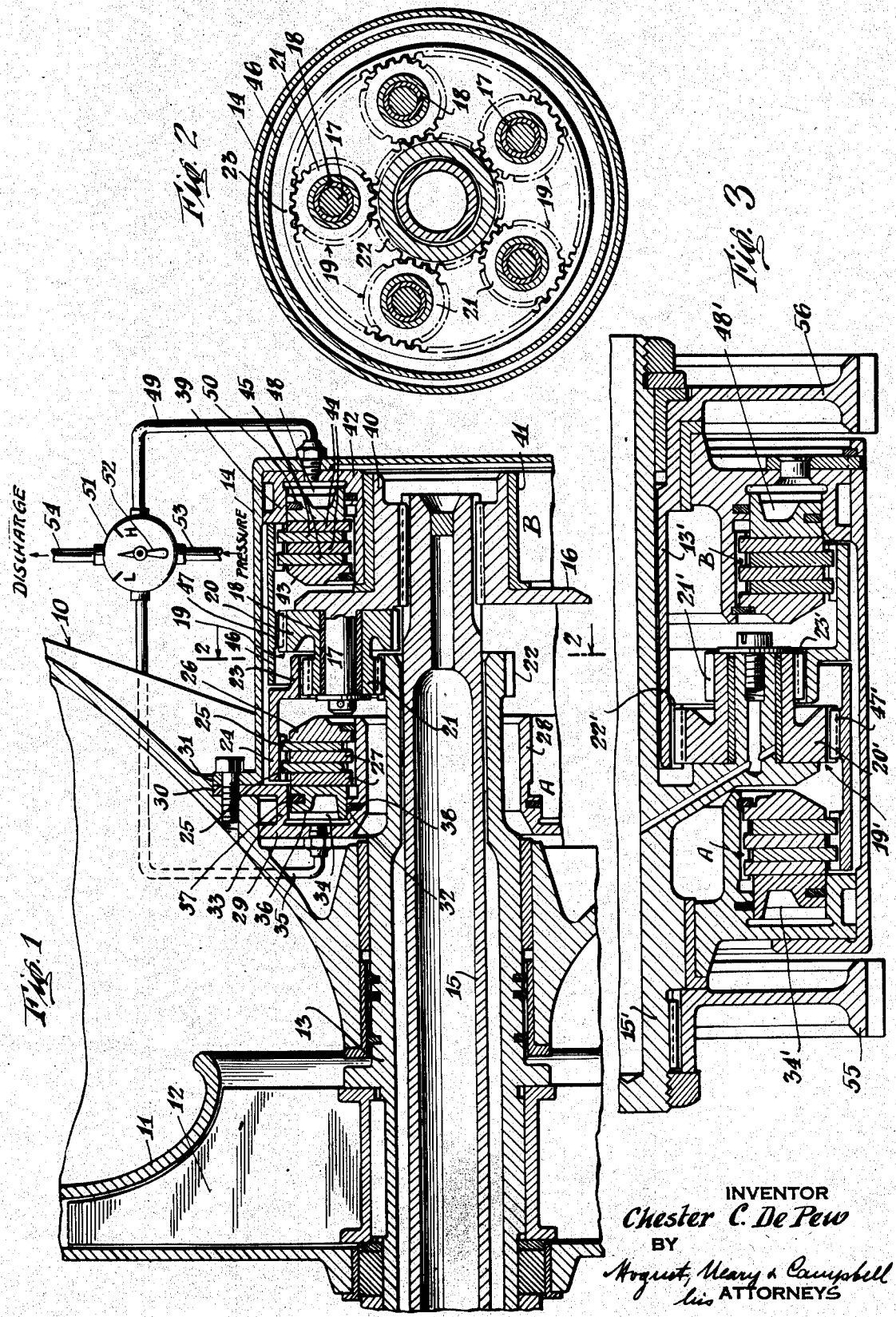
INVENTOR
*Chester C. De Pew*
BY
*Horquist, Neary & Campbell*
his ATTORNEYS Patented Aug. 18, 1942

2,293,050

UNITED STATES PATENT OFFICE 2,293,050

SPEED CHANGE MECHANISM

Chester C. De Pew, Farmingdale, N. Y., assignor to Fairchild Engine and Airplane Corporation, Farmingdale, N. Y., a corporation of Maryland Application May 27, 1940, Serial No. 337,429

6 Claims. (Cl. 74—277)

This invention relates to speed change mechanism, and has particular reference to variable speed planetary gear type transmissions for changing the speed of the driving member for a pump impeller, aircraft propeller, or other driven element.

In variable speed transmissions adapted particularly for aircraft use, such as those interposed between the engine and the propeller, between the engine and the impeller of a supercharger, and the like, lightness, compactness, minimum number of parts, accessibility, and, principally, reliability and speed of operation are essential.

In accordance with this invention, a variable speed transmission is provided having the aforementioned characteristics and many additional advantages, as will readily be apparent from the following description.

A preferred embodiment of the invention comprises a rotary driving member operatively connected to the power source, such as an aircraft engine or the like, and carrying a circular series of planet gears journalled in stub shafts secured thereto. Each planet gear comprises a plurality of integral or connected pinions, each of different diameter, and each meshing with a corresponding ring gear selectively connectible to a fixed part by means of a stationary fluid-operated brake. One of the pinions of each planet gear meshes with a gear on the driven member, so that, by selectively engaging the corresponding brake, the fixed speed of rotation of the planet pinion is imparted to the driven member. By proper arrangement of the planet pinions, various compound epicyclic driving gear trains are provided, so that manipulating of a fluid control valve enables the selection of any one of the several speeds available for driving the propeller, impeller, or other driven element.

By utilizing simple disc brakes surrounding the driven member coaxially with the planet gears, and similarly arranging the fluid-operated cylinders for the brakes, a very compact cylindrically-shaped transmission of two or more speeds is obtained, which is instantly operable by means of the control valve conveniently located in the cockpit for controlling fluid pressure from a readily available source, such as that otherwise utilized for adjusting the pitch of the propeller, operating landing gear, and the like.

For a more complete understanding of the invention, reference may be had to the accompanying drawing, in which:

Figure 1 is an axial section through one form of the speed change mechanism of this invention and illustrates one mode of its application;

Fig. 2 is a transverse section therethrough as seen along the line 2—2 of Fig. 1; and, Fig. 3 is an axial section through another form of the mechanism of the invention.

Referring to Fig. 1 of the drawing, illustrating by way of example, the application of the invention to an aeroplane engine supercharger 10, having the usual scroll 11, and the impeller 12 keyed on tubular drive shaft 13. Shaft 13 projects from the casing of supercharger 10 and serves as the driven member for the speed change mechanism of this invention which is contained in the cylindrical housing 14, suitably secured to the supercharger casing 10 coaxially with the driven member 13. The driving member 15, geared for otherwise connected to the engine or other power source, not shown, is telescoped within driven member 13 and projects beyond the end thereof, as shown.

Keyed on the projecting end of the driving member 15 so as to rotate therewith is a disc 16 having a circular series of stub shafts 17 projecting therefrom parallel to the axis of driving member 15. In the construction illustrated, particularly in Fig. 2, five of such stub shafts 17 are provided, although more or less may be utilized, depending on requirements.

Journalled on each stub shaft 17, over a suitable bushing 18, is a planet gear 19. This planet gear 19, in the two-speed construction illustrated, comprises two integral pinions of different diameters, the larger pinion being designated 20 and the smaller pinion 21.

Each small pinion 21 meshes with a gear 22 formed on the end of the driven member 13 for driving the same when the transmission is in operation and rotating around it when the transmission idles. Small pinions 21 also mesh with an internal ring gear 23 on drum 24, carrying at its other end a pair of brake plates 25, which are non-rotatably splined thereto so as to permit limited axial movement thereof.

Brake plates 25 are interposed between fixed abutment plate 26 and splined non-rotatable brake plates 27 on the tubular inner flange 28 of the base plate 29, whose flange 30 is clamped between the casing of supercharger 10 and the flange 31 of the housing 14, as shown in Fig. 1. Drum 24 with its brake plates 25 may rotate relatively to fixed brake plates 26 and 27, and stationary cylinder 34. It will be understood that the engaging brake plates 25, 26 and 27 may be surfaced with friction material.

Formed between a hub 32 on inner flange 28 and an outer cylindrical flange 33 of base plate 29 is an annular chamber 34, which serves as a pressure cylinder supplied with fluid under pressure, such as oil, by means of pipe 35. The inner surfaces of the hub 32 and flange 33 are accurately machined to form two parallel cylindrical surfaces between which the ring-shaped piston 36 is slidably mounted. Sealing ring 37 in piston 36 and sealing ring 38 in hub 32 seal the piston fluid-tightly in its cylinder 34. It will be observed that piston 36 acts as a presser plate for the corresponding brake, which is designated A.

A similar brake, designated B, is carried by stationary sleeve 39 suitably secured within the housing 14, and serving as a bearing for the hub 40 of the planet gear disc 16, which rotates within bushing 41 interposed between hub 40 and inner flange 42 of sleeve 39. The non-rotating brake plates 43 and 44 are mounted on flange 42, plates 44 being non-rotatably splined for limited axial movement. Interposed between these fixed brake plates 43 and 44 are the co-operating brake plates 45 non-rotatably splined on the inner surface of drum 46 aligned with drum 24 of brake A. The inner surface of drum 46 is provided with an internal ring gear 47, with which the large pinions 20 of planet gears 19 mesh. Drum 46 with its clutch plates 45 may rotate relatively to fixed brake plates 43 and 44.

An annular pressure cylinder 48, supplied with fluid under pressure from pipe 49 is formed between the walls of sleeve 39 and ring-shaped piston 50, which acts as a presser plate for brake B and is constructed and arranged like piston 36 of brake A.

The respective actuating cylinders 34 and 48 of brakes A and B are connected by the corresponding pipes 35 and 49 to a three-way valve 51 located in the cockpit, or the like, and actuated by a suitable lever 52 for connecting either pipe 35 or 49 to pressure pipe 53 supplying fluid under pressure from a suitable source, not shown.

In operation of the form of the invention illustrated in Figs. 1 and 2, and assuming that low speed transmission is desired, the operator turns control valve handle 52 to low speed position L on the valve dial, thus connecting the high pressure source through pipe 53 to pipe 35 leading to cylinder 34 of brake A. The fluid pressure in cylinder 34 causes piston 36 to urge the brake plates 25, 26 and 27 into braking engagement, thus holding drum 24 and ring gear 23 stationary. Accordingly, as driving disc 16 rotates, the planet gears 19 drive the driven member 13 and impeller 12 directly through the small pinions 21 interposed between gears 22 and 23. Meanwhile, brake B being disengaged, large pinions 20 of planet gears 19 perform no driving function.

For high speed operation, lever 52 is shifted to indicate H on the dial, which results in disconnection of pipe 35 from pressure pipe 53 and connection thereof to discharge pipe 54, so that brake A is disengaged. At the same time pipe 49 is connected to pressure pipe 53, thereby supplying pressure to cylinder 49, causing piston 50 to engage brake B. Although disc 16 rotates at the same speed as before, driven shaft 13 and connected impeller 12 are driven at higher speed, for the reason that the peripheral speed of each large pinion 20, as it rolls around large diameter fixed ring gear 47, is higher than that of small pinion 21, due to the compound epicyclic gear train, as will be readily understood.

The form of the invention illustrated in Fig. 3 is essentially the same as that illustrated in Fig. 1, except that the driving and driven members are located at opposite ends of the transmission instead of the same end, and the large pinions of the planet gears are directly connected to the driven member. Thus, driving member 15', driven by gear 55, is located at one end, and driven member 13', driving gear 56, is located at the opposite end. The large pinions 20' of planet gears 19' are directly geared to gear 22' on driven member 13', so that when brake A is engaged, by applying fluid pressure to cylinder 34' in the manner described, large pinions 20' roll around fixed ring gear 47', thus directly driving driven member 13', and gear 56 at low speed. When brake A is disengaged by releasing the pressure in cylinder 34' and brake B is engaged by applying pressure to cylinder 48', small pinions 21' are directly driven through their connection with fixed ring gear 23'. Since the peripheral speed of large pinions 20' is greater than that of connected small pinions 21', by reason of their greater diameter, driven member 13', and gear 56 is driven at high speed.

It will be seen that the same gear train in the transmission of this invention is operable both as a simple and compound epicyclic train, thereby reducing the number of gears usually necessary to obtain the same result. Also, it will be observed that the brake operating cylinders 34 and 48 are stationary at all times, so that there can be no locking of the brakes by reason of accumulated oil sludge in the cylinders which is forced against the presser plates by centrifugal force as is frequently the case when rotating brakes are employed. This is of great importance in aircraft installations where absolute reliability is required. Other advantages of compactness, simplicity and accesibility are apparent from the foregoing description.

While certain preferred forms of the invention have been illustrated and described herein, it is to be understood that the invention is not limited thereby, but is susceptible of changes in form and detail within the scope of the appended claims. For example, although two speeds are provided for in the embodiments disclosed, three or more may be provided in the same way merely by increasing the number of pinions of the planet gears and adding a corresponding number of clutches and operating cylinders.

I claim:

1. In speed change mechanism, the combination of a driving member, a driven member, planet gears carried by said driving member, each of said gears comprising at least two relatively non-rotatable pinions of different diameters, driving connections between one of said pinions and the driven member, a ring gear meshing with each of the same diameter pinions, a brake element carried by each of said ring gears, a stationary brake element for cooperating with each of said ring gear brake elements, a pressure plate for engaging each set of brake elements and holding the corresponding ring gear stationary, said plate constituting a piston in a stationary cylinder, a source of fluid pressure, a pipe connecting said source to each of said cylinders, and a valve interposed in each of said pipes for selectively controlling the supply of fluid pressure to said cylinders to operatively connect the corresponding planet pinion between said driving and driven members.

2. In speed change mechanism, the combination of a driving member, a driven member, planet gears carried by one of said members, each of said gears comprising at least two relatively non-rotatable pinions of different diameters, driving connections between one of said pinions and the other of said members, a ring gear meshing with each of the same diameter pinions, means for holding each of said ring gears stationary, said holding means including a brake element on each ring gear and a fixed brake element, a fluid pressure cylinder for each of said brake elements, a piston in each cylinder operatively connected to the corresponding set of brake elements for controlling the engagement and disengagement thereof, a source of fluid pressure connected to each cylinder, and a valve interposed in said last-named connections for regulating the supply of fluid pressure to the corresponding cylinder for controlling the operative connection of the corresponding planet gear between the driving and driven members.

3. In speed change mechanism, the combination of a driving member, a driven member, planet gears carried by one of said members, each of said gears comprising at least two relatively non-rotatable pinions of different diameters, a direct connection between only the pinions of one diameter and the other of said members, a ring gear surrounding and meshing with all of the pinions of one diameter, a drum carrying each ring gear and arranged for rotation coaxially with said members, a brake element fixed on and extending inwardly from the inner surface of each drum, a fixed brake element disposed within each drum arranged for cooperation with each of said drum elements, a fluid pressure cylinder for each set of said brake elements and having a piston therein coaxial with said drums adjacent their outer ends for controlling the engagement and disengagement thereof, and means for supplying fluid under pressure to each of said cylinders for actuating the corresponding brake to hold the corresponding drum and ring gear stationary, whereby the corresponding diameter planet gear pinions effect driving relation between said driving and driven members through said directly connected pinions.

4. In speed change mechanism, the combination of a driving member, a driven member axially aligned therewith, a plurality of planet gears carried by said driving member for bodily rotation thereby, each of said gears comprising a plurality of relatively non-rotatable pinions of different diameters, driving connections between one of said pinions and said driven member, a member ring gear meshing with each of the same diameter pinions surrounding the same coaxially with said driving and driven members, a brake element disposed within and rotatable with each ring gear member, a non-rotatable brake element cooperating with said ring gear brake element and arranged coaxially therewith, a stationary annular fluid pressure cylinder for each set of brake elements disposed adjacent to the outermost ends of said ring gear member and arranged coaxially therewith, an annular piston in each cylinder movable axially of said brake elements for controlling the engagement and disengagement thereof, and means for controlling the supply of fluid pressure to each of said cylinders for holding and releasing the corresponding ring gear for operatively connecting the corresponding planet pinion combination between said driving and driven members.

5. In a speed change mechanism, the combination of a stationary housing, driving and driven members rotatably mounted in and extending axially of said housing, a plurality of planet gears supported by said driving member for bodily rotation therewith, each of said gears comprising a pair of relatively non-rotatable pinions of different diameter, a pair of drums disposed coaxially with said members within said housing, an internal ring gear adjacent the inner end of each of said drums, each ring gear meshing with all of the pinions having the same diameter, a driving connection between one of the sets of pinions of the same diameter and said driven member, a brake element adjacent the outer end of and within each of said drums and rotatable therewith, brake elements fixed to each end of said housing disposed within each of said drums and inwardly of the brake elements on said drums, a cylinder in each end of said housing adjacent the outer ends of said drums, pistons in said cylinders movable to engage the brake elements on said drums and force the latter into engagement with the brake elements on said housing to thereby hold said ring gears against rotation, and means for controlling the supply of fluid pressure to said cylinder for holding or releasing the corresponding ring gear.

6. In a speed change mechanism, the combination of driving and driven members, a plurality of planet gears supported by one of said members for bodily rotation therewith, each of said gears comprising a pair of relatively non-rotatable pinions of different diameter, a pair of drums disposed coaxially with said members, an internal ring gear adjacent the inner end of said drums, each ring gear meshing with all of the same diameter pinions, a driving connection between one of the sets of pinions of the same diameter and the other of said members, a braking element adjacent the outer end of and slidable axially within each of said drums and rotatable therewith, stationary brake elements disposed within each of said drums, pressure members movable to engage the slidable brake elements and force the latter into engagement with the stationary brake elements to thereby hold said ring gears against rotation, and means for selectively moving said pressure members to hold or release the corresponding ring gear.

CHESTER C. DE PEW.